US008538725B2

United States Patent
Lee et al.

(10) Patent No.: US 8,538,725 B2
(45) Date of Patent: *Sep. 17, 2013

(54) ABSOLUTE DIAMETER MEASUREMENT ARM

(75) Inventors: Robert M. Lee, Magnolia, MA (US); Robert E. Parsons, Gloucester, MA (US)

(73) Assignee: Axiam, Inc., Gloucester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,035

(22) Filed: Jun. 7, 2012

(65) Prior Publication Data

US 2012/0310595 A1     Dec. 6, 2012

Related U.S. Application Data

(63) Continuation of application No. 12/695,304, filed on Jan. 28, 2010, now Pat. No. 8,219,353.

(60) Provisional application No. 61/148,857, filed on Jan. 30, 2009.

(51) Int. Cl.
  *G01B 5/08*   (2006.01)
  *G01B 11/08*  (2006.01)
  *G01B 11/10*  (2006.01)

(52) U.S. Cl.
  CPC ............. *G01B 11/08* (2013.01); *G01B 11/105* (2013.01)
  USPC ........................................................ 702/157

(58) Field of Classification Search
  USPC ........................................................ 702/157
  See application file for complete search history.

(56) References Cited

U.S. PATENT DOCUMENTS

| 4,131,387 | A |   | 12/1978 | Kazin et al. |
| 4,428,126 | A |   | 1/1984  | Banks |
| 4,538,455 | A |   | 9/1985  | Klufas |
| 4,585,379 | A | * | 4/1986  | Nagayama et al. ........... 409/147 |
| 4,709,485 | A |   | 12/1987 | Bowman |
| 5,373,922 | A |   | 12/1994 | Marra |
| 5,400,638 | A | * | 3/1995  | Kim ............................. 73/1.79 |
| 5,414,929 | A |   | 5/1995  | Floser et al. |

(Continued)

FOREIGN PATENT DOCUMENTS

EP   1 467 063 A1   10/2004
GB   2 423 341 A    8/2006

OTHER PUBLICATIONS

Axiam Incorporated Product Brochure of GMX 4000 Smart Stack™ Systems, "For Assembly of Aircraft Jet Engines and Industrial Gas Turbines" (1991).

(Continued)

*Primary Examiner* — Sujoy Kundu
*Assistant Examiner* — Timothy H Hwang
(74) *Attorney, Agent, or Firm* — Hamilton, Brook, Smith & Reynolds, P.C.

(57) ABSTRACT

A measurement apparatus calibrated to measure an absolute diameter of a part in a shop floor environment. The measurement apparatus includes a calibration that includes compensation factors for thermal expansion, shifting of measurement parts (arm, support tower, and related laser), and variances of these parts. The resulting measurements report an absolute diameter of a part to a higher degree of accuracy than previously possible. Also, the calculated compensation factor eliminate the need for an isolated, climate-controlled measurement room.

23 Claims, 8 Drawing Sheets

(56) References Cited

U.S. PATENT DOCUMENTS

| | | | |
|---|---|---|---|
| 5,537,861 | A | 7/1996 | Seitelman et al. |
| 5,538,258 | A | 7/1996 | Hager et al. |
| 5,564,656 | A | 10/1996 | Gilbert |
| 5,636,848 | A | 6/1997 | Hager et al. |
| 5,689,435 | A | 11/1997 | Umney et al. |
| 5,768,149 | A | 6/1998 | Umney et al. |
| 5,806,161 | A | 9/1998 | Schneider |
| 5,821,412 | A | 10/1998 | Bryant et al. |
| 6,062,062 | A * | 5/2000 | Toida et al. .............. 73/1.81 |
| 6,101,911 | A | 8/2000 | Newell et al. |
| 6,114,773 | A | 9/2000 | Kouris |
| 6,148,518 | A | 11/2000 | Weiner et al. |
| 6,148,533 | A | 11/2000 | Hutter |
| 6,341,419 | B1 | 1/2002 | Forrester et al. |
| 6,452,179 | B1 | 9/2002 | Coates et al. |
| 6,473,794 | B1 | 10/2002 | Guheen et al. |
| 6,482,094 | B2 | 11/2002 | Kefes |
| 6,484,574 | B1 | 11/2002 | Douglas et al. |
| 6,519,571 | B1 | 2/2003 | Guheen et al. |
| 6,563,074 | B2 | 5/2003 | Bazukuri et al. |
| 6,898,547 | B1 | 5/2005 | Deblois et al. |
| 7,090,464 | B2 | 8/2006 | Henning et al. |
| 7,175,342 | B2 * | 2/2007 | Tanaka et al. .............. 374/55 |
| 7,539,594 | B2 | 5/2009 | Lee et al. |
| 7,565,257 | B2 | 7/2009 | Lee |
| 7,890,292 | B2 * | 2/2011 | Jacquot .............. 702/157 |
| 2002/0122583 | A1 | 9/2002 | Thompson |
| 2004/0027562 | A1 * | 2/2004 | Otsuka et al. .............. 356/154 |
| 2004/0073338 | A1 * | 4/2004 | Kobi .............. 700/279 |
| 2005/0234576 | A1 * | 10/2005 | Lee .............. 700/97 |
| 2006/0010686 | A1 | 1/2006 | Henning et al. |
| 2006/0114469 | A1 * | 6/2006 | Horvath et al. .............. 356/450 |
| 2007/0014660 | A1 | 1/2007 | Lee |
| 2007/0258669 | A1 | 11/2007 | Lee |
| 2009/0234481 | A1 | 9/2009 | Lee et al. |
| 2009/0258669 | A1 * | 10/2009 | Nie et al. .............. 455/552.1 |
| 2009/0293276 | A1 | 12/2009 | Deblois et al. |
| 2009/0320309 | A1 | 12/2009 | Lee |

OTHER PUBLICATIONS

Axiam Incorporated Product Brochure of Axiam's Rotor Assembly Process, Tools & Training, "Build Engine Rotors Within Compliance Reduce Turn Time, Decrease Vibration and Cut Costs" (1991).

Merriam Webster's online dictionary, http://www.meriam-webster.com/dictionary/dimensions, p. 1.

* cited by examiner

ABSOLUTE DIAMETER MEASUREMENT ARM

RELATED APPLICATION(S)

This application is a continuation of U.S. application Ser. No. 12/695,304, filed Jan. 28, 2010 now U.S. Pat. No. 8,219,353, which claims the benefit of U.S. Provisional Application No. 61/148,857, filed on Jan. 30, 2009. The entire teachings of the above applications are incorporated herein by reference.

BACKGROUND OF THE INVENTION

In assembly of rotary machines, such as gas turbine engines, many measurements of parts are taken to determine assembly orientation to minimize vibration and run-out. Current measurement apparatuses are only capable of performing relative measurements, such as eccentricity and roundness.

SUMMARY OF THE INVENTION

Embodiments of the present invention perform calibration steps that improve the accuracy of measurements and then use the higher-accuracy measurements of a part to compute the part's absolute diameter. Embodiments of the present invention account for error caused by temperature changes, movements of measurement parts, and unavoidable alignment imprecision between parts of the measurement apparatus.

In one embodiment, a system includes a rotary table on a base, a support tower on the base that carries a horizontal measurement arm, and a laser device configured to indicate change in orientation of the horizontal measurement arm with respect to a centerline of rotation of the rotary table. The system is calibrated at multiple heights to determine (i) a measurement error factor of the horizontal measurement arm, (ii) a measurement error factor caused by displacement of the horizontal measurement arm, which is caused by variation of the support tower, and (iii) a measurement error factor caused by displacement of the laser path. The system measures multiple points around a circumference of a subject object on the rotary table and a temperature is measured for each point. Each measurement point is corrected based on the three factors described above and also based on a thermal expansion correction factor based on the measured temperature for the point. An absolute diameter and radius of the subject object are determined from the corrected multiple points.

In some embodiments, the measurement error factor caused by displacement of the horizontal measurement arm is determined as a function of height above a reference height on the support tower. In some embodiments, the measurement error factor caused by displacement of the laser path is determined as a function of height above a reference height on the support tower. In some embodiments, the measurement error factor of the horizontal measurement arm is determined by comparing a measured radius of a test object to the known radius of the test object, and the measurement error factor being the difference between the two. In some embodiments, the measurement error factor caused by displacement of the horizontal measurement arm, determined as a function of height on the support tower, is determined by determining the error factor at two heights on the support tower and interpolating between the two measurement errors. In some embodiments, the measurement error factor caused by the displacement of the laser path, determined as a function of height on the support tower, is determined by measuring the measurement error factor at two heights on the support tower and interpolating between those two heights.

In some embodiments, the absolute diameter and radius of a subject object are determined by applying the corrected multiple points in a multi-point polygon mathematical model.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
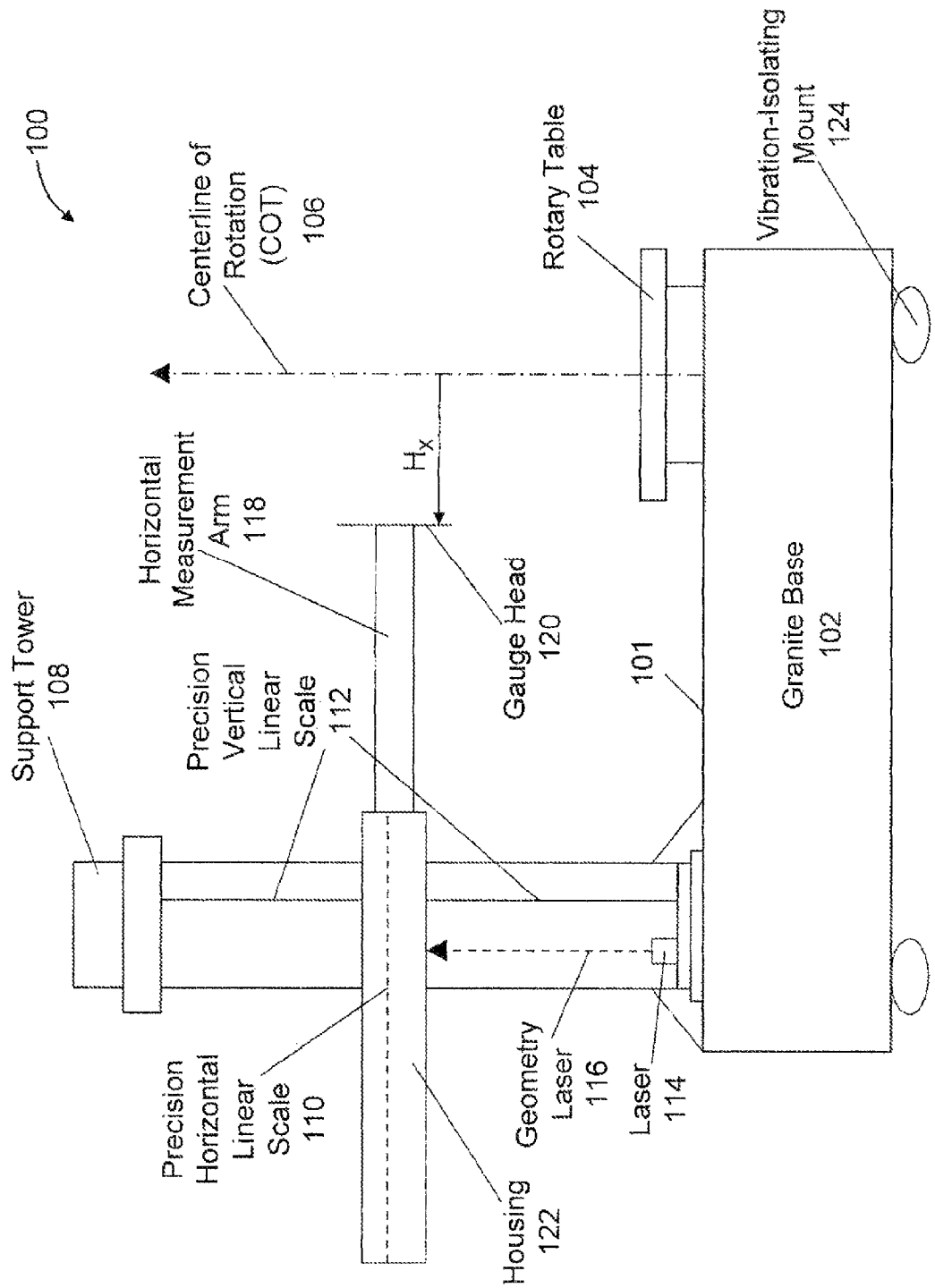
FIG. 1 is a side view of an absolute diameter measurement apparatus embodying the present invention.

FIG. 1 shows a measurement apparatus 100 according to an embodiment of the present invention. The measurement apparatus 100 includes a base 102 preferably made out of granite. Granite is heavy and insensitive to thermal changes, thereby providing a stable platform on which measurements may be performed. Granite is also easy to precisely mill to provide a nearly-perfect flat and level upper surface 101 on which to perform the measurements. A person having ordinary skill in the art understands that other materials also may provide an acceptable base 102 with level upper surface 101 for the measurement apparatus.

The granite base 102 is mounted to a vibration-isolating mount 124 to isolate the base 102 from ambient shop vibrations. The vibration-isolating mounts 124 are shown in conceptual form in FIG. 1. A person having ordinary skill in the art understands that there are many ways to incorporate vibration-isolating mounts 124 in the installation of the measurement apparatus 100, and that the vibration-isolating mounts 124 may take many different forms, such as rubber pads or a spring suspension.

A high-precision rotary table 104 and high-stiffness support tower 108 are mounted to the level upper surface 101 of the granite base 102. The high-precision rotary table 104 supports parts being measured (not shown). The high-stiffness support tower 108 carries a precision horizontal linear scale (PHLS) 110 and a high-stiffness horizontal arm 118. The high-stiffness horizontal arm 118 has a known length L, which is known to a high degree of precision. The PHLS 110 and high-stiffness horizontal arm 118 positionally move along a vertical (or along a longitudinal) axis of the high-stiffness support tower 108. The PHLS 110 measures the horizontal position of high-stiffness horizontal arm 118, which moves laterally or horizontally, i.e., at a right angle, to the high-stiffness support tower 108. The PHLS 110 is typically measuring the distance from a gauge head 120, mounted to the distal end of the high-stiffness horizontal arm 118, from the centerline of rotation 106 of the high-precision rotary table 104. The gauge head 120 may be configured to measure either an interior surface diameter or an exterior surface diameter of a subject part positioned on rotary table 104. A person having ordinary skill in the art understands that the precision horizontal scale 110 may measure a different distance, e.g., a distance of the gage head 120 from a surface of the housing 122.

Gage heads, such as gage head 120, typically make contact with an object, e.g., subject part, being measured. The gage heads are typically capable of deflection to avoid transmitting forces to the object being measured. Such gage heads are usually high precision where the position of the gage head and any deflection are known to a very high degree of accuracy. There are many types of precision gage heads available that are known to persons having ordinary skill in the art, any of which are suitable for use in the measurement arm 118 described herein. For the purposes of the measurement arm 118 described herein, the gage head 120 is assumed to be a part of the horizontal measurement arm 118 and to have no deflection.

The high-stiffness support tower 108 also carries a precision vertical linear scale (PVLS) 112, which measures the height of housing 122 and high-stiffness horizontal arm 118 above the upper planar surface 101 of the granite base 102 (or above the surface of a base made of a different material). A laser 114 is also mounted at the granite base 102 and is aligned so that its centerline beam is nearly-perfectly parallel to the centerline of rotation 106 of the high-precision rotary table 104. The laser 114 measures a displacement of the housing 122 and high-stiffness horizontal arm 118 perpendicular to the laser 114 centerline beam. This perpendicular displacement also corresponds to an equivalent radial displacement of the housing 122 and high-stiffness horizontal arm 118 with the centerline of rotation 106 of the high-precision rotary table 104. The housing 122 and high-stiffness horizontal arm 118 may displace, i.e., shift, perpendicular to the longitudinal axis of the high-stiffness support tower 108 as they move vertically on the high-stiffness support tower 108 for two reasons: displacement of the high-stiffness support tower 108 away from the parallel axis, i.e., tower sway, and imperfections in the surface of the high-stiffness support tower 108.

Figure 2B:
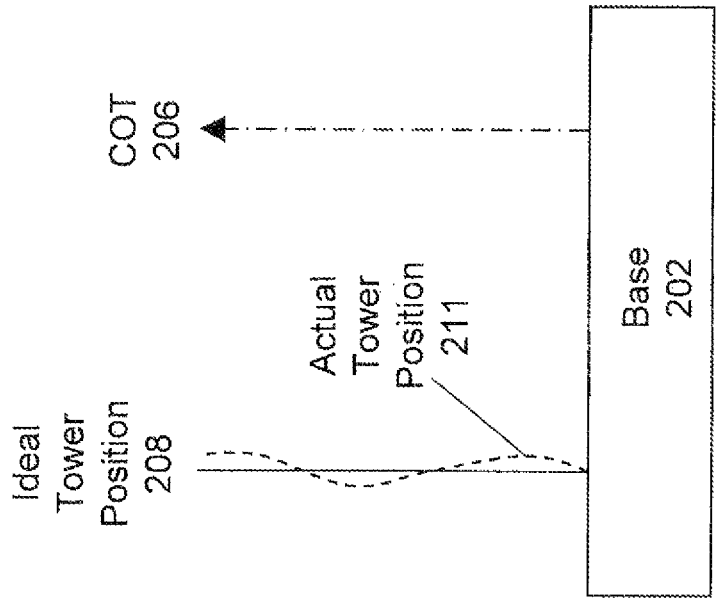
FIG. 2B is a conceptual drawing showing support tower variance.
Figure 2A:
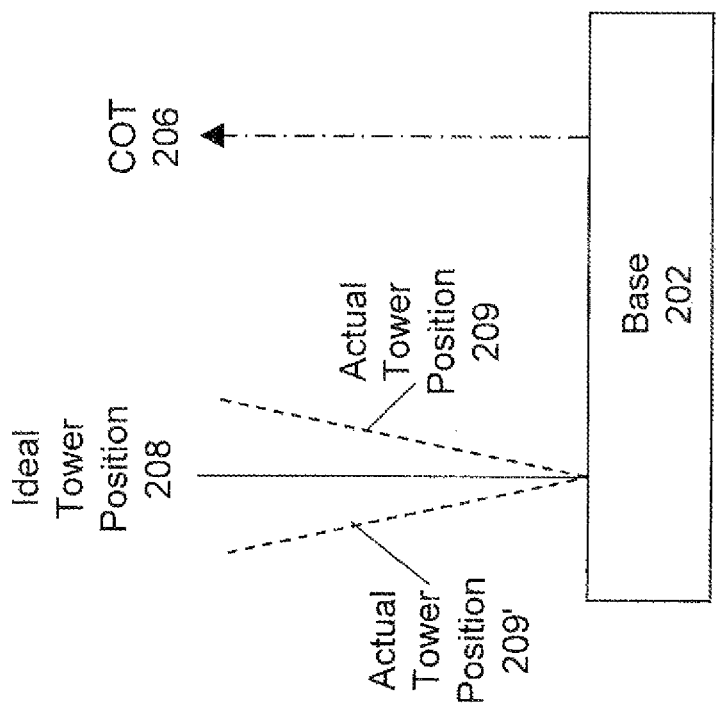
FIG. 2A is a conceptual drawing showing support tower lean.

FIGS. 2A and 2B illustrate these two reasons for perpendicular displacement of the housing 122 and high-stiffness horizontal arm 118 from FIG. 1. FIG. 2A shows a base 202 and a centerline of rotation 206 of a high-precision rotary table (not shown) and an ideal tower position 208. The ideal tower position 208 is perfectly parallel to the centerline of rotation 206. However, the tower (such as tower 108) will deflect by a small amount due in part to the tower 108 not being perfectly perpendicular to the base 202 and due to the weight of the housing (not shown) and high-stiffness horizontal arm (not shown) exerting a bending moment on the tower. Thus, the actual tower is not perfectly parallel to the centerline of rotation 206 and is a displaced tower (generally position referenced displacement 209). Generally, the higher the housing (not shown) and high-stiffness horizontal arm (not shown) move up (away from base surface 101) along the high-stiffness support tower 108, the greater the high-stiffness support tower 108 will deflect from ideal position 208. Note that the actual tower displacement 209 is shown greatly exaggerated for illustration purposes. Further note that the actual tower displacement 209 may be in a different direction, such as displacement 209'.

FIG. 2B shows a base 202 and a centerline of rotation 206 of a high-precision rotary table (not shown) and an ideal tower position 208. Again, the ideal tower position 208 is perfectly parallel to the centerline of rotation 206. However, the tower will have small variances caused by manufacturing imperfections. FIG. 2B illustrates an actual tower position 211 that is different from the ideal tower position 208. The tower variance 211 is shown greatly exaggerated for illustration purposes.

Figure 3:
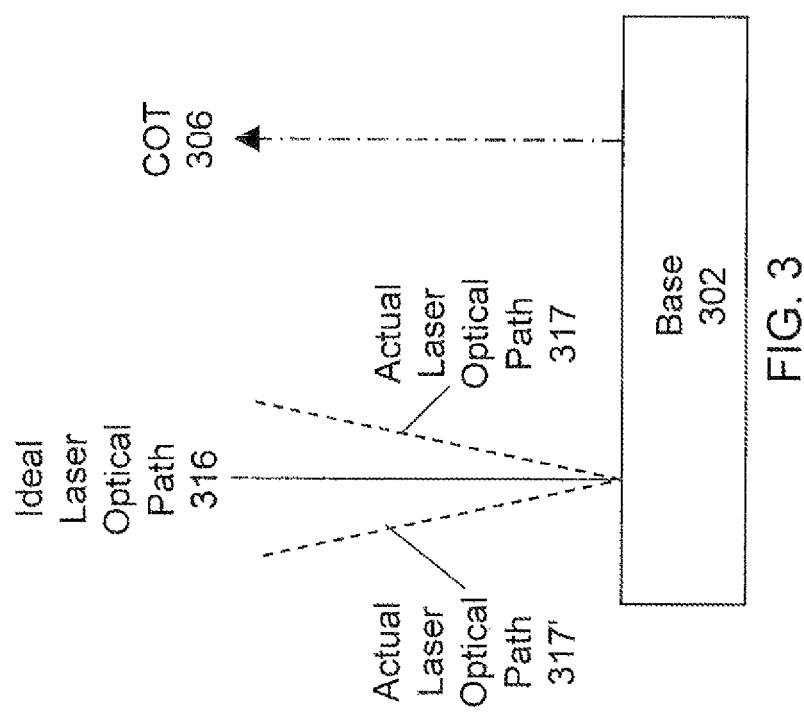
FIG. 3 is a conceptual drawing showing laser beam variance from an ideal laser optical path.

The laser (114 in FIG. 1) measures variations in perpendicular displacement of the housing (122 in FIG. 1) and high-stiffness horizontal arm (118 in FIG. 1) with respect to the longitudinal direction of the support tower 108. However, the laser (114 in FIG. 1) also has an error component because its optical path is not at all times perfectly parallel to the centerline of rotation (106 in FIG. 1) of the high-precision rotary table (104 in FIG. 1). FIG. 3 illustrates the laser misalignment. FIG. 3 shows a base 302 and a centerline of rotation 306 of a high-precision rotary table (not shown in FIG. 3, but 104 in FIG. 1, for example). FIG. 3 also shows an ideal laser optical path 316 (laser not shown) that is perfectly parallel to the centerline of rotation 306. However, the actual laser optical path 317 is not perfectly parallel. Note that the actual laser path 317 misalignment is greatly exaggerated for illustrative purposes. Also note that the laser misalignment may be in different directions, such as line 317' for example.

Figure 4B:
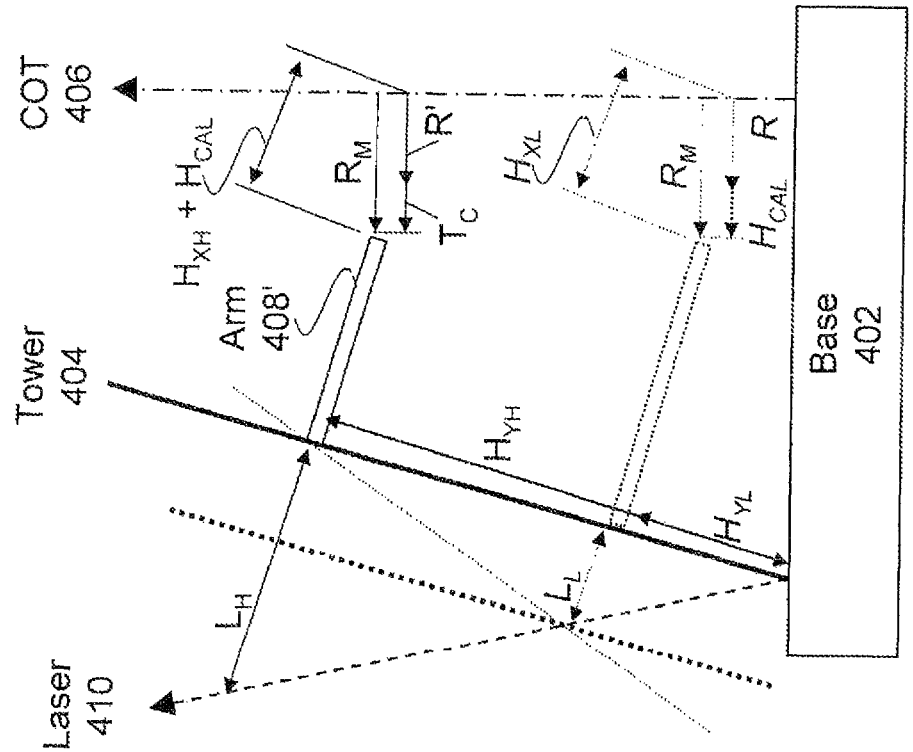
FIG. 4B is a conceptual drawing showing calibration measurements at a second height employed by embodiments of the present invention.
Figure 4A:
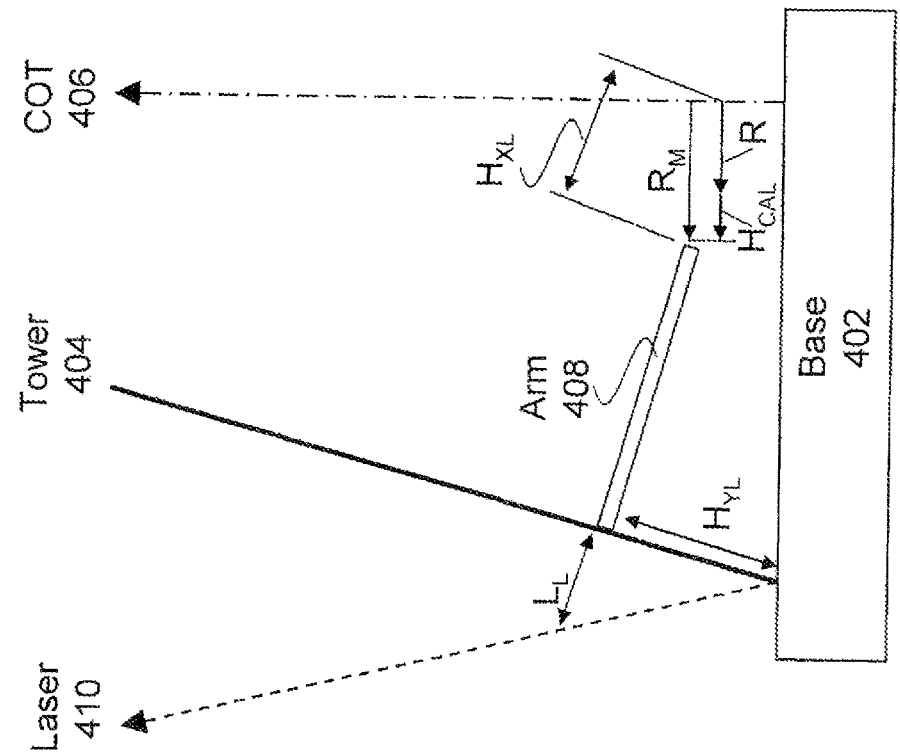
FIG. 4A is a conceptual drawing showing calibration measurements at a low (or reference) height employed by embodiments of the present invention.

FIG. 4A illustrates the measurements involved in calibrating an absolute diameter measurement arm according to an embodiment of the present invention. FIG. 4A shows a line 404 representing a tower (such as 108 in FIG. 1) mounted to a base 402. The high-stiffness support tower 404 is shown leaning (greatly exaggerated for illustration purposes) away (or off) from perpendicular relative to the upper planar surface (such as 101 in FIG. 1) of the base 402. FIG. 4A also shows a centerline of rotation (COT) 406 of a high-precision rotary table (not shown, but see 104 in FIG. 1) and a horizontal measurement arm 408 (i.e., 118 in FIG. 1). In this first step, the horizontal measurement arm 408 is set at a low height $H_{YZ}$ on the tower 404 and the horizontal measurement arm 408 is set at zero with respect to the COT 406. Thus, motions of the horizontal measurement arm 408 away from the COT 406 result in an increasing radius measurement of a subject on the high-precision rotary table 104. After the horizontal measurement arm 408 is set at zero with respect to the COT 406, a master ring having known radii $R_M$ is placed on the high-precision rotary table (not shown, but 104 in FIG. 1) at the low point $H_{YZ}$. For each radius on the master ring (not shown), the horizontal measurement arm 408 measures 2,000 points $H_{XZ}$ around the master ring's circumference. The 2,000 points $H_{XZ}$ are entered into a multi-point polygon model, which calculates a radius R from the points. Examples of multi-point polygon models that may be used or employed include known least squares best fit algorithms or other known mathematical fit models. The calculated radius R is compared to the known radius $R_M$ of the master ring, and the difference is a calibration difference $H_{CAL}$ for the horizontal measurement arm 408 at low height $H_{YL}$. These steps are performed for different known radii on the master ring to gather several $H_{CAL}$ values.

Before the horizontal measurement arm 408 is moved from the low height $H_{YL}$, an laser offset value $L_L$ is also read, which represents misalignment between the laser beam 410 and the tower 404 at that height $H_{YL}$. The laser offset value $L_L$ is the distance between (i) the intersection between the horizontal arm 408 axis and the laser beam 410 at the low height $H_{YL}$ and (ii) the intersection between the horizontal arm and the support tower 404 at the low height $H_{YL}$. Also, a thermocouple measures the temperature of the high-stiffness horizontal measurement arm 408 during the measurement of the 2,000 points $H_{XL}$. A length correction can be applied to each of the 2,000 points $H_{XL}$ by calculating the change in temperature from a starting temperature and multiplying the change in temperature by a known coefficient of expansion of the material from which the high-stiffness horizontal measurement arm 408 is made.

In a second step, shown in FIG. 4B, the high-stiffness horizontal measurement arm is moved to a high position 408'. At the high position, the high position height $H_{YH}$ is measured and the laser offset value $L_H$ at this height is measured. The laser offset value $L_H$ is the distance between (i) $L_L$ (from the intersection between the horizontal arm axis and the laser beam 410 at the low height $H_{LH}$) and (ii) the intersection between the horizontal arm axis and the laser beam 410 at the high height $H_{YH}$, less the calibration difference (see below). The master ring (not shown) is again measured at 2,000 circumferential points around each of its different radii. At each radius, the horizontal measurement arm's 408' 2,000 measurements $H_{XH}$ are combined with the $H_{CAL}$ value for the radius that was calculated at the low point $H_{YL}$. Also, temperature measurements are taken at each of the 2,000 points $H_{XH}$ and a temperature correction, as described above, is incorporated into the measurements. The 2,000 combined $H_{XH} + H_{CAL}$ values are again entered into the least squares best fit model, which calculates a radius R'. The calculated radius R' is compared to the known radius $R_M$ of the master ring, and the difference is the calibration difference $T_C$ for the horizontal measurement arm 408' at the high position $H_{YH}$. The calibration difference $T_C$ is applied to the laser offset value $L_H$ to remove from the laser offset value $L_H$ any affect caused by the tower lean angle being different from the laser misalignment angle.

Figure 5:
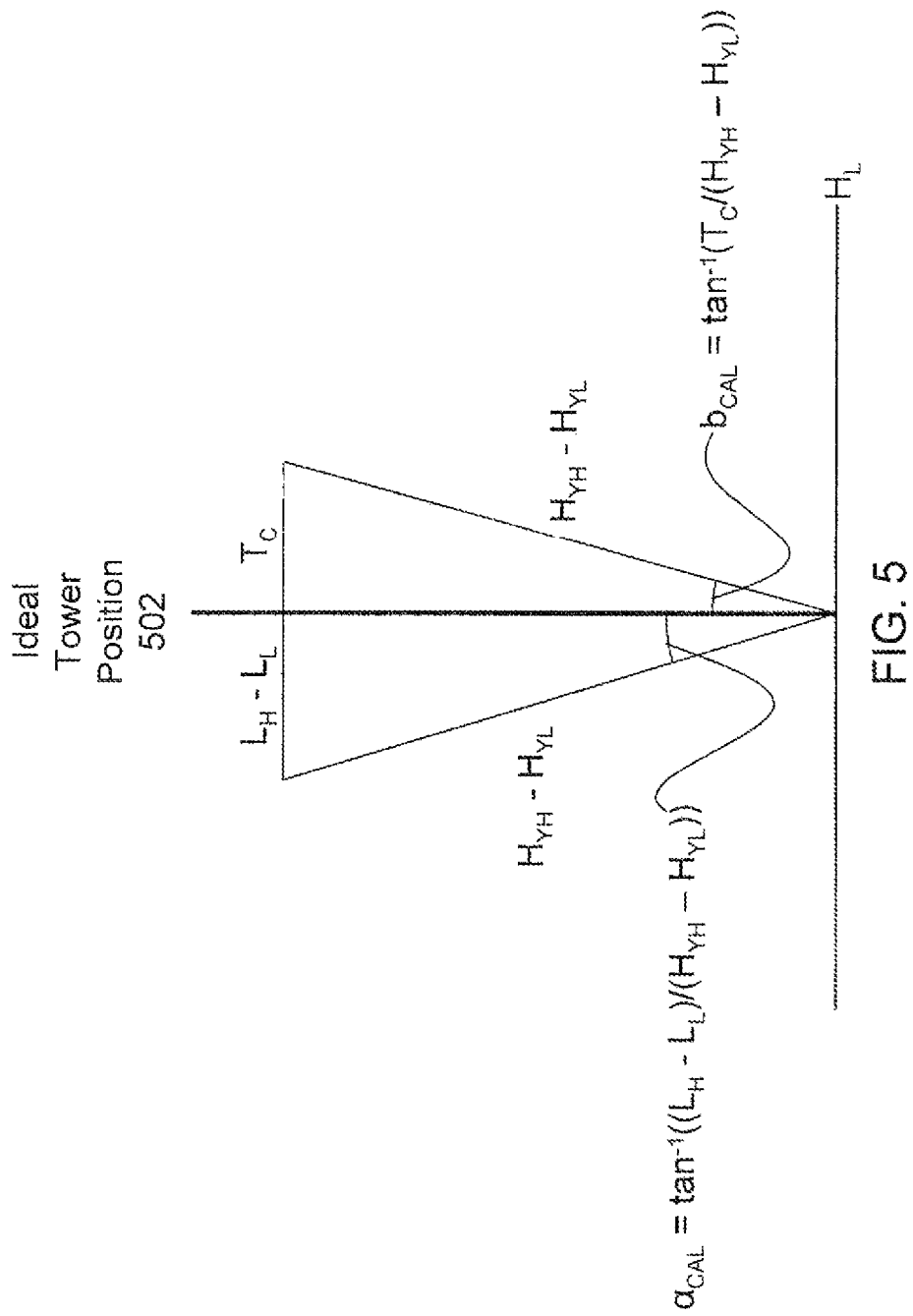
FIG. 5 is a conceptual drawing showing calibration calculations performed from calibration measurements shown in FIGS. 4A and 4B.

FIG. 5 illustrates calculations that are performed based on the above-described measurements. The calibration difference $T_C$ is a distance measure of the amount of tower lean. The tower lean can be described by an angle $b_{CAL}$ by the equation: $b_{CAL} = \tan^{-1}(T_C/(H_{YH}-H_{YL}))$. The laser lean angle (relative to the ideal tower) $\alpha_{CAL}$ can also be calculated by the equation: $\alpha_{CAL} = \tan^{-1}((L_H-L_L)/(H_{YH}-H_{YL}))$. Note that the sum of angles $\alpha_{CAL}$ and $b_{CAL}$ results in a constant value. Any local imperfections in the tower, i.e., differences from the ideal tower position 502 will cause an increase in one of the two angles and an equal decrease in the other angle such that the summed angle value remains constant.

Figure 6:
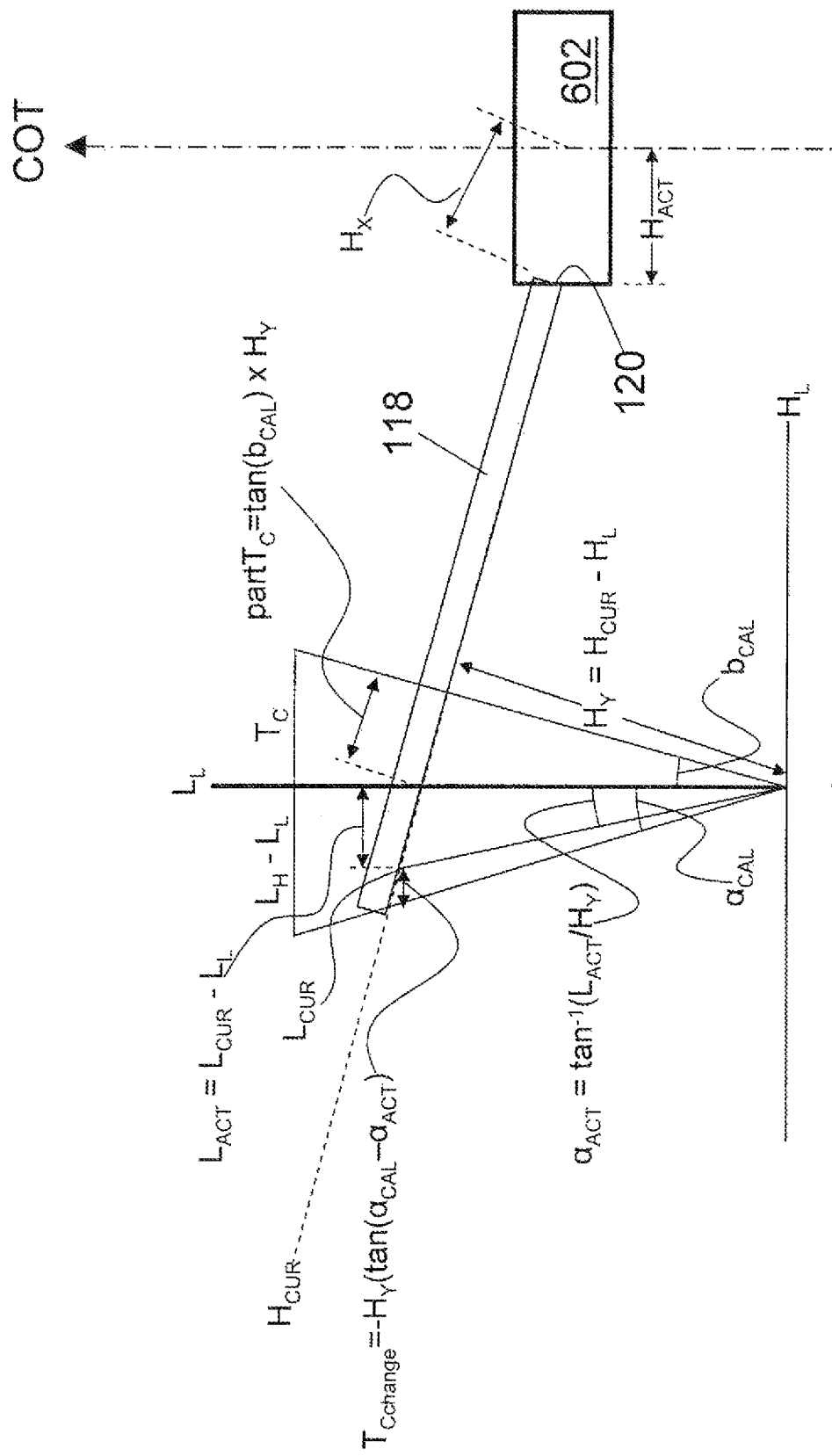
FIG. 6 is a conceptual drawing showing measurements performed on a calibrated absolute diameter measurement apparatus of the present invention, such as the apparatus shown in FIG. 1, on a part to measure the part's absolute diameter.

FIG. 6 illustrates measurement of a subject part 602 on the high-precision rotary table (not shown, but see 104 in FIG. 1) using the now-calibrated measurement arm 118. The horizontal measurement arm 118 is moved to a (current) height $H_{CUR}$ at the height of the part radius to be measured. The height $H_{CUR}$ is translated into $H_Y$ by the equation: $H_Y = H_{CUR} - H_{YL}$. Next, a current laser measurement $L_{CUR}$ is read and is translated to an actual reading by the equation: $L_{ACT} = L_{CUR} - L_L$.

The actual laser angle $\alpha_{ACT}$ can be calculated by the equation: $\alpha_{ACT} = \tan^{-1}(L_{ACT}/H_Y)$. As stated above, the sum of $\alpha_{CAL}$ and $b_{CAL}$ results in a constant value, which translates into a known height at a given $H_Y$. The change in the tower offset due to variations $T_{Cchange}$ can be calculated according to the equation: $T_{Cchange} = -H_Y(\tan(\alpha_{CAL} - \alpha_{ACT}))$. After determining the tower variation offset $T_{Cchange}$, the high-precision gauge head 120 on the horizontal measurement arm 118 is brought into contact with the subject part 602 being measured and $H_X$ (the reading on the horizontal linear scale) is read and s temperature correction is applied. The offset for tower lean part $T_C$ is then calculated based on the equation: part $T_C = \tan(b_{CAL}) \times H_Y$. All of the above-calculated variables and corrections are combined to form an actual radius measurement $R_{ACT}$ according to the equation: $R_{ACT} = H_X + H_{CAL} + \text{part}T_C + T_{Cchange}$. $H_{ACT}(=R_{ACT})$ is calculated for 2,000 points around the circumference of the subject part 602 and entered into a multi-point polygon model, such as a least squares best fit model. The least squares best fit model outputs the absolute radius (or absolute diameter, which is the absolute radius multiplied by two) of the subject part 602.

Figure 7:
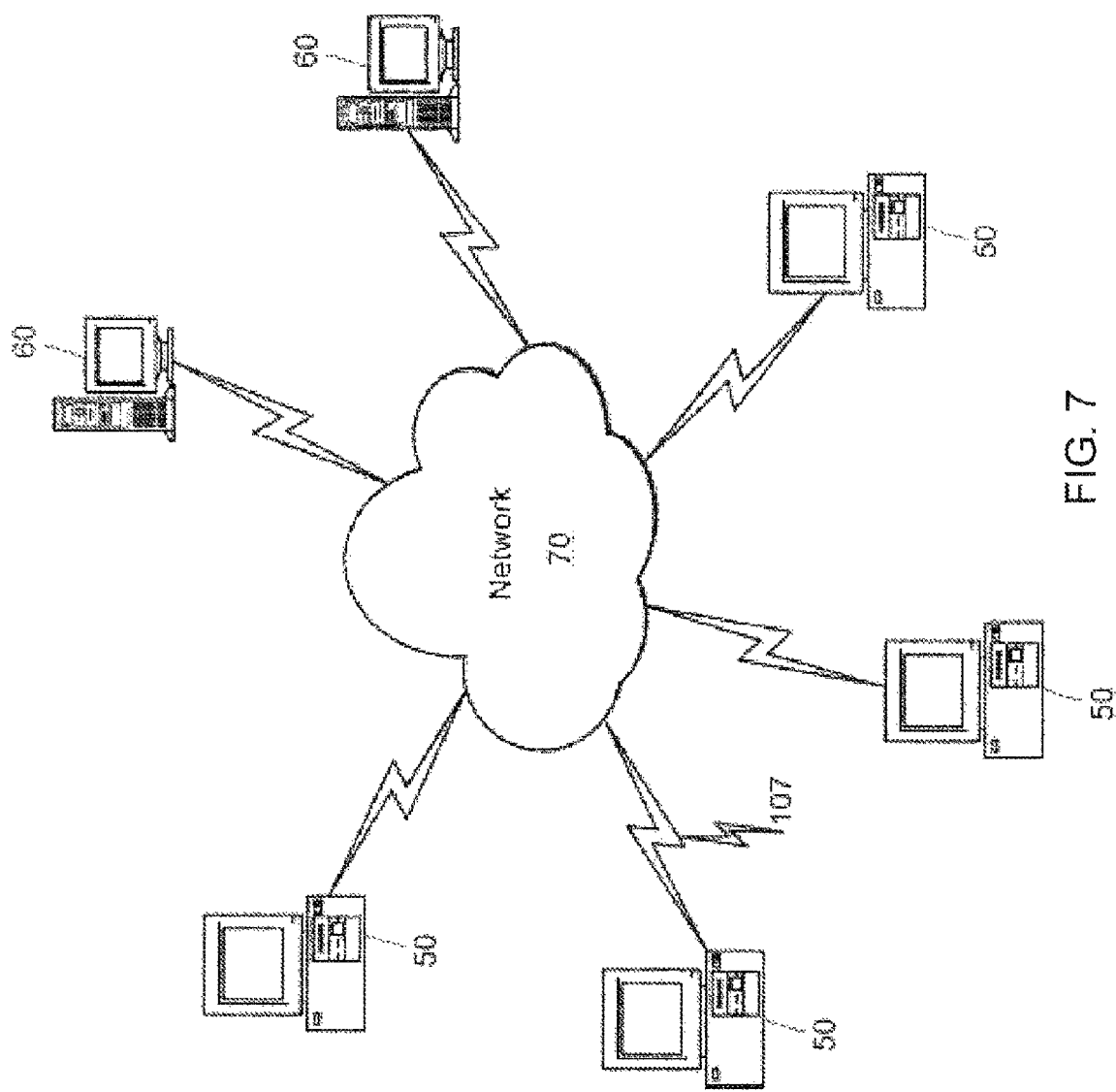
FIG. 7 is a schematic view of a computer network in which embodiments are deployed.

FIG. 7 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 8:
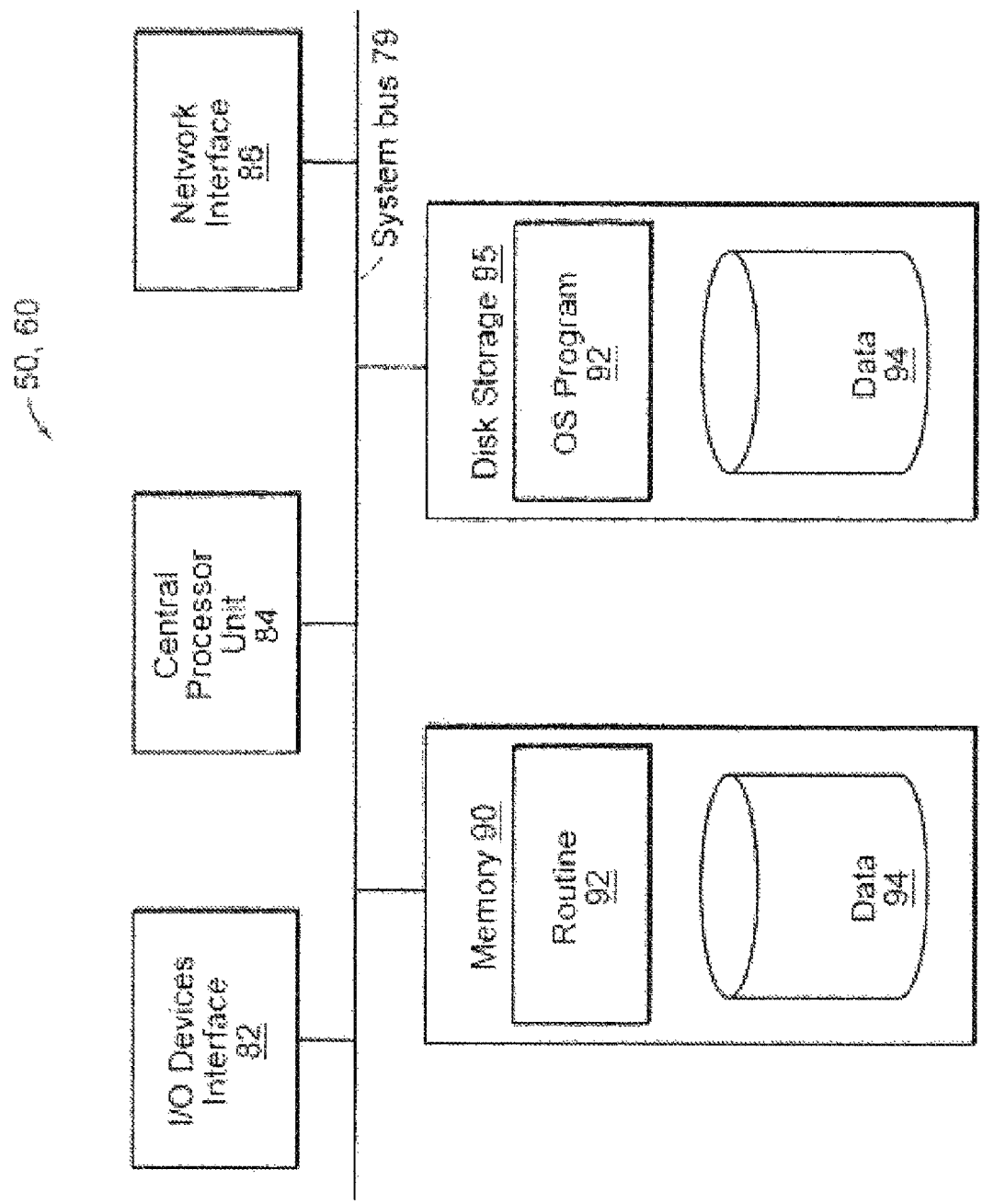
FIG. 8 is a block diagram of a computer node in the network of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., error measurement code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method of determining absolute diameter of an object on a rotary table, comprising:
   on an assembly formed of (i) a rotary table on a base, and (ii) a support tower on the base and carrying a horizontal measurement arm,
   calibrating the horizontal measurement arm including determining (a) a measurement error of the horizontal measurement arm at a reference height, (b) a displacement factor $b_{CAL}$ of the support tower, and (c) a displacement factor $\alpha_{CAL}$ of a laser path aligned relative to a centerline of rotation of the rotary table;
   using the calibrated horizontal measurement arm, measuring a plurality of points around a circumference of a subject object on the rotary table with sufficient accuracy to compute absolute diameter of the subject object instead of a relative measurement, by (i) measuring each point with the horizontal measurement arm at a height equal to or greater than the reference height, (ii) measuring temperature of the horizontal measurement arm for each measured point and determining a respective thermal expansion factor of the measured point, and (iii) for each measured point, determining a respective corrected point by applying the respective thermal expansion factor, the determined measurement error and a compensation factor to the measured point, the compensation factor being determined as a function of $\alpha_{CAL}$, $b_{CAL}$ and height of the horizontal measurement arm relative to the reference height, wherein sum of $\alpha_{CAL}$ and $b_{CAL}$ is a constant value; and
   applying the determined corrected points in a multi-point polygon model and determining absolute diameter of the subject object.

2. The method of claim 1 wherein determining $\alpha_{CAL}$ is as a function of height above the reference height.

3. The method of claim 1 wherein determining $b_{CAL}$ is as a function of height above the reference height.

4. The method of claim 1 wherein determining the measurement error of the horizontal measurement arm at the reference height comprises measuring a known radius of a test object at the reference height, the measurement error of the horizontal measurement arm being the difference between a radius measured by the horizontal measurement arm and the known radius of the test object.

5. The method of claim 4 wherein determining a displacement factor $b_{CAL}$ of the support tower comprises measuring a known radius of a test object at a second height above the reference height, the displacement factor $b_{CAL}$ being calculated as the difference between a measured radius from the horizontal arm, with the measurement error of the horizontal measurement arm included, and the known radius of the object, the displacement factor $b_{CAL}$ being capable of interpolation between zero at the reference height and the measured radius with the first compensation factor included at the second height.

6. The method of claim 5 wherein determining a displacement factor $\alpha_{CAL}$ of the laser path comprises measuring the horizontal displacement of a perpendicular measurement arm housing relative to the support tower at the reference height and at the second height above the reference height, the displacement factor $\alpha_{CAL}$ of the laser path being calculated as the difference between the measured perpendicular displacement at the reference height and the measured perpendicular displacement at the second height, the displacement factor $\alpha_{CAL}$ of the laser path being capable of interpolation between zero at the reference height and the second compensation factor at the second height.

7. The method of claim 6 wherein the perpendicular displacement is measured with a laser at the support tower and aligned substantially parallel to the centerline of rotation of the rotary table.

8. The method of claim 1 where determining the absolute diameter comprises employing the multi-point polygon mathematical model to provide a radius.

9. The method of claim 8 wherein the multi-point polygon model is a least squares best fit model.

10. A method of calibrating measurements by a horizontal measurement arm, comprising:
    (a) given a high precision rotary table on a base, a support tower on the base carrying a horizontal measurement arm, and a laser device configured to indicate change in orientation of the horizontal measurement arm with respect to a centerline of rotation of the high precision rotary table, the laser device having a laser path aligned relative to the centerline of rotation of the rotary table;
    (b) determining a measurement error by:
        determining a first compensation factor for measurement error of a horizontal measurement arm;
        determining a second compensation factor for lean of a support tower carrying the horizontal measurement arm as a function of height above a reference height;
        determining a third compensation factor for variation of the support tower as a function of height above the reference height;
        determining a fourth compensation factor for thermal expansion of the horizontal measurement arm as a function of temperature; and (c) using the determined measurement error to effectively obtain a calibrated measurement of each point in a plurality of points around a circumference of an object on a rotary table with sufficient accuracy to compute absolute diameter of the object instead of a relative measurement of roundness, by (i) measuring each point with the horizontal measurement arm at a height equal to or greater than the reference height, and (ii) determining a plurality of corrected points around the circumference by applying the first compensation factor, second compensation factor, third compensation factor, and fourth compensation factor to each of the measured points; such that an absolute radius of the object is able to be determined by applying the plurality of corrected points in a multi-point polygon model.

11. The method of claim 10 wherein determining the first compensation factor for measurement error of a horizontal measurement arm comprises measuring the radius of an object with a known radius at the reference height, the first compensation factor being the difference between a measured radius from the horizontal arm and the known radius of the object.

12. The method of claim 11 wherein determining the second compensation factor for lean of a support tower comprises measuring the radius of the object with the known radius at a second height above the reference height, the second compensation factor at the second height being calculated as the difference between a measured radius from the horizontal arm with the first compensation factor included and the known radius of the object, the second compensation factor capable of interpolation between zero at the reference height and the measured radius with the first compensation factor included at the second height.

13. The method of claim 10 wherein determining the third compensation factor for variation of the support tower as a function of height above the reference height comprises measuring the horizontal displacement of a horizontal measurement arm housing relative to the support tower at the reference height and at a second height, the second compensation factor at the second height being calculated as the difference between the measured horizontal displacement at the reference height and the measured horizontal displacement at the second height, the second compensation factor capable of interpolation between zero at the reference height and the second compensation factor at the second height.

14. The method of claim 13 wherein the horizontal displacement is measured with a laser at the base of support tower aligned substantially parallel to the axis of rotation of the rotary table and aimed at a reference on the horizontal measurement arm housing.

15. The method of claim 10 wherein measuring the fourth compensation factor for thermal expansion of the horizontal measurement arm as a function of temperature comprises measuring the temperature of the horizontal measurement arm, calculating the change in temperature from a reference temperature, the fourth compensation factor being a thermal expansion length calculated by multiplying the change in temperature by a coefficient of thermal expansion of the material of the horizontal measurement arm.

16. The method of claim 10 wherein the multi-point polygon model is a least-squares best-fit model.

17. An apparatus for measuring absolute diameter of an object on a rotary table, comprising:
a support tower mounted to a flat surface of a stable base, the support tower substantially perpendicular to the flat surface, the stable base including vibration-isolating mounts to isolate the stable base from ambient vibrations;
a horizontal measurement arm mounted to the support tower substantially parallel to the flat surface and configured to move towards and away from a centerline of rotation of a precision rotary table mounted to the flat surface of the stable base, the horizontal measurement arm configured to measure a distance of a precision gauge head on an end of the horizontal measurement arm from the centerline of rotation;
a thermocouple mounted to the horizontal measurement arm configured to measure the temperature of the horizontal measurement arm;
a laser mounted to a base of the support tower and pointed substantially parallel to the centerline of rotation of the rotary table, laser light from the laser aimed at a housing of the horizontal measurement arm; and
a computer controller configured to:
  (i) determine a first compensation factor for measurement error of the horizontal measurement arm;
  (ii) determine a second compensation factor for lean of the support tower as a function of height above a reference height;
  (iii) determine a third compensation factor for variation of the support tower as a function of height above the reference height;
  (iv) determine a fourth compensation factor for thermal expansion of the horizontal measurement arm as a function of temperature;
  (v) obtain a calibrated measurement of each point in a plurality of points around a circumference of an object on the rotary table with sufficient accuracy to compute absolute diameter of the object instead of a relative measurement of roundness, by (a) measuring each point with the horizontal measurement arm at a height equal to or greater than the reference height and (b) determining a plurality of corrected points around the circumference by applying the first compensation factor, second compensation factor, third compensation factor, and fourth compensation factor to each of the measured points; and
  (vi) determine an absolute radius of the object by applying the plurality of corrected points in a multi-point polygon model.

18. The apparatus of claim 17 wherein the vibration-isolating mounts comprise at least one of rubber bushings and a spring suspension.

19. The apparatus of claim 17 wherein the computer controller determines the first compensation factor for measurement error of the horizontal measurement arm by measuring the radius of an object with a known radius at the reference height on the support tower, the first compensation factor being the difference between a measured radius from the horizontal arm and the known radius of the object.

20. The apparatus of claim 19 wherein the computer controller determines the second compensation factor for lean of the support tower as a function of height above a reference height by measuring the radius of the object with the known radius at a second height above the reference height, the second compensation factor at the second height being calculated as the difference between a measured radius from the horizontal arm with the first compensation factor included and the known radius of the object, the second compensation factor capable of interpolation between zero at the reference height and the measured radius with the first compensation factor included at the second height.

21. The apparatus of claim 17 wherein the computer controller determines the third compensation factor for variation of the support tower as a function of height above the reference height by measuring the horizontal displacement of a horizontal measurement arm housing relative to the support tower at the reference height and at a second height, the second compensation factor at the second height being calculated as the difference between the measured horizontal displacement at the reference height and the measured horizontal displacement at the second height, the second compensation factor capable of interpolation between zero at the reference height and the second compensation factor at the second height.

22. The apparatus of claim 17 wherein the computer controller determines the fourth compensation factor for thermal expansion of the horizontal measurement arm as a function of temperature by measuring the temperature of the horizontal measurement arm, calculating the change in temperature from a reference temperature, the fourth compensation factor being a thermal expansion length calculated by multiplying the change in temperature by a coefficient of thermal expansion of the material of the horizontal measurement arm.

23. The apparatus of claim 17 wherein the multi-point polygon model used by the computer controller is a least-squares best-fit model.

* * * * *